(12) United States Patent
Farouki (10) Patent No.: US 9,575,712 B2
(45) Date of Patent: Feb. 21, 2017

(54) INTERACTIVE WHITEBOARD SHARING

(71) Applicant: Microsoft Corporation, Redmond, WA (US)

(72) Inventor: Karim Farouki, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 765 days.

(21) Appl. No.: 13/687,681

(22) Filed: Nov. 28, 2012

(65) Prior Publication Data

US 2014/0149880 A1    May 29, 2014

(51) Int. Cl.
| | |
|---|---|
| G06F 3/0481 | (2013.01) |
| G06F 3/14 | (2006.01) |
| H04L 12/18 | (2006.01) |
| H04N 1/00 | (2006.01) |
| H04N 7/15 | (2006.01) |

(52) U.S. Cl.
CPC ......... *G06F 3/1454* (2013.01); *H04L 12/1822* (2013.01); *H04N 1/00129* (2013.01); *H04N 7/15* (2013.01)

(58) Field of Classification Search
CPC .................................................... G06F 3/1454
See application file for complete search history.

(56) References Cited

U.S. PATENT DOCUMENTS

| | | | |
|---|---|---|---|
| 6,840,442 B2 | 1/2005 | Swaminathan et al. | |
| 7,010,752 B2 | 3/2006 | Ly | |
| 7,508,354 B1 | 3/2009 | Sanders et al. | |
| 8,279,186 B2 | 10/2012 | Pearce et al. | |
| 2004/0017400 A1 | 1/2004 | Ly et al. | |

(Continued)

FOREIGN PATENT DOCUMENTS

WO    2012091723 A1    7/2012

OTHER PUBLICATIONS

"International Search Report & Written Opinion for PCT Patent Application No. PCT/US2013/072437", Mailed Date: Sep. 25, 2014, 7 Pages.

(Continued)

*Primary Examiner* — William Bashore
*Assistant Examiner* — Nathan Shrewsbury
(74) *Attorney, Agent, or Firm* — Michael David Ream; Tom Wong; Micky Minhas (57) ABSTRACT

Technologies are generally described for providing interactive whiteboard sharing. An interactive whiteboard may enable two or more users to control and interact directly with an interactive whiteboard interface. The whiteboard may also enable users to interact with the whiteboard employing individual client devices connected with the whiteboard over a wireless or wired network. The whiteboard may distinguish each input method and the source of the input. The whiteboard may share the content of the whiteboard's user interface with the user's individual client device, and the user may interact with the whiteboard content on a user interface of the client device. The whiteboard may detect the input on the client device, and may update the content of the whiteboard interface with the input provided at each of the client devices such that the whiteboard may continuously reflect content updates and changes input on the interactive whiteboard and on connected client devices.

16 Claims, 8 Drawing Sheets

(56) References Cited

U.S. PATENT DOCUMENTS

| | | | |
|---|---|---|---|
| 2007/0106950 A1* | 5/2007 | Hutchinson et al. | 715/761 |
| 2009/0234721 A1 | 9/2009 | Bigelow et al. | |
| 2010/0017727 A1* | 1/2010 | Offer et al. | 715/753 |
| 2010/0100866 A1* | 4/2010 | Kamper et al. | 717/105 |
| 2010/0191799 A1 | 7/2010 | Fiedorowicz et al. | |
| 2011/0197132 A1* | 8/2011 | Escoda | H04L 67/38 715/733 |
| 2012/0020562 A1* | 1/2012 | Vojak | 382/182 |
| 2012/0113238 A1* | 5/2012 | Yamamoto et al. | 348/61 |
| 2012/0176308 A1* | 7/2012 | Westermann | G06F 3/038 345/156 |
| 2012/0278738 A1 | 11/2012 | Kruse et al. | |
| 2013/0047093 A1* | 2/2013 | Reuschel et al. | 715/753 |
| 2014/0040767 A1* | 2/2014 | Bolia | 715/751 |

OTHER PUBLICATIONS

Sibbet, David, "Visual Teams: Graphic Tools for Commitment, Innovation, and High Performance", Retrieved at <<http://www.amazon.com/Visual-Teams-Commitment-Innovation-Performance/dp/1118077431>>, Oct. 11, 2011, pp. 2.

Gumienny, et al., "Tele-Board: Enabling Efficient Collaboration in Digital Design Spaces", Retrieved at <<http://www.hpi.uni-potsdam.de/fileadmin/hpi/FG_ITS/papers/Design_Thinking/2011_Gumienny_CSCWD.pdf>>, 2011, pp. 8.

"Supplementary Search Report Issued in European Patent Application No. 13815201.2", Mailed Date: Jun. 6, 2016, 8 Pages.

\* cited by examiner

INTERACTIVE WHITEBOARD SHARING

BACKGROUND

With the proliferation of collaborative computing and networking technologies, the need to share content and to control and interact with shared is prevalent. Teleconferencing and desktop sharing are example techniques for enabling users in remote locations to share content and to interact with each other without being in the physical presence of each other. Additionally, the ability to continuously share content, interact with and update content has become useful as users collaborate on projects and desire to generate and update content in real-time. Interactive whiteboards are often used to capture written content on a display screen and enable real-time content manipulation, however conventional interactive whiteboards may not have the capabilities of enabling multiple users to manipulate and provide content or enabling interaction from remote locations.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an interactive whiteboard sharing platform. An interactive whiteboard may enable two or more users to interact with, control, and provide content to an interactive whiteboard concurrently. The interactive whiteboard may enable two or more users to directly provide input to the interface of the whiteboard, and the interactive whiteboard may also enable users to provide input to the whiteboard employing individual client devices connected to the interactive whiteboard over a wired or wireless network. The interactive whiteboard may detect the input provided on two or more client devices and may distinguish the source of the input. The interactive whiteboard may continuously display input on the interface of the whiteboard for enabling collaboration by two or more users on content displayed by the interactive whiteboard.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, technologies are generally described for providing interactive whiteboard sharing. An interactive whiteboard may enable two or more users to control and interact directly with an interactive whiteboard interface. The whiteboard may also enable users to interact with the whiteboard employing individual client devices connected with the whiteboard over a wireless or wired network. The whiteboard may share the content of the whiteboard's user interface with the user's individual client device, and the user may interact with and control the whiteboard content on a user interface of the client device. The whiteboard may continuously track input, and may distinguish each input method and the source of the input. The whiteboard may detect the input on the client device, and may update the content of the whiteboard interface with the input provided at each of the client devices such that the whiteboard may continuously reflect content updates and changes input on the interactive whiteboard and on connected client devices.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device (hardware). The computer-readable storage medium can for example be implemented via one or more of a volatile computer memory, a non-volatile memory, a hard drive, a flash drive, a floppy disk, or a compact disk, and comparable media.

Figure 1:
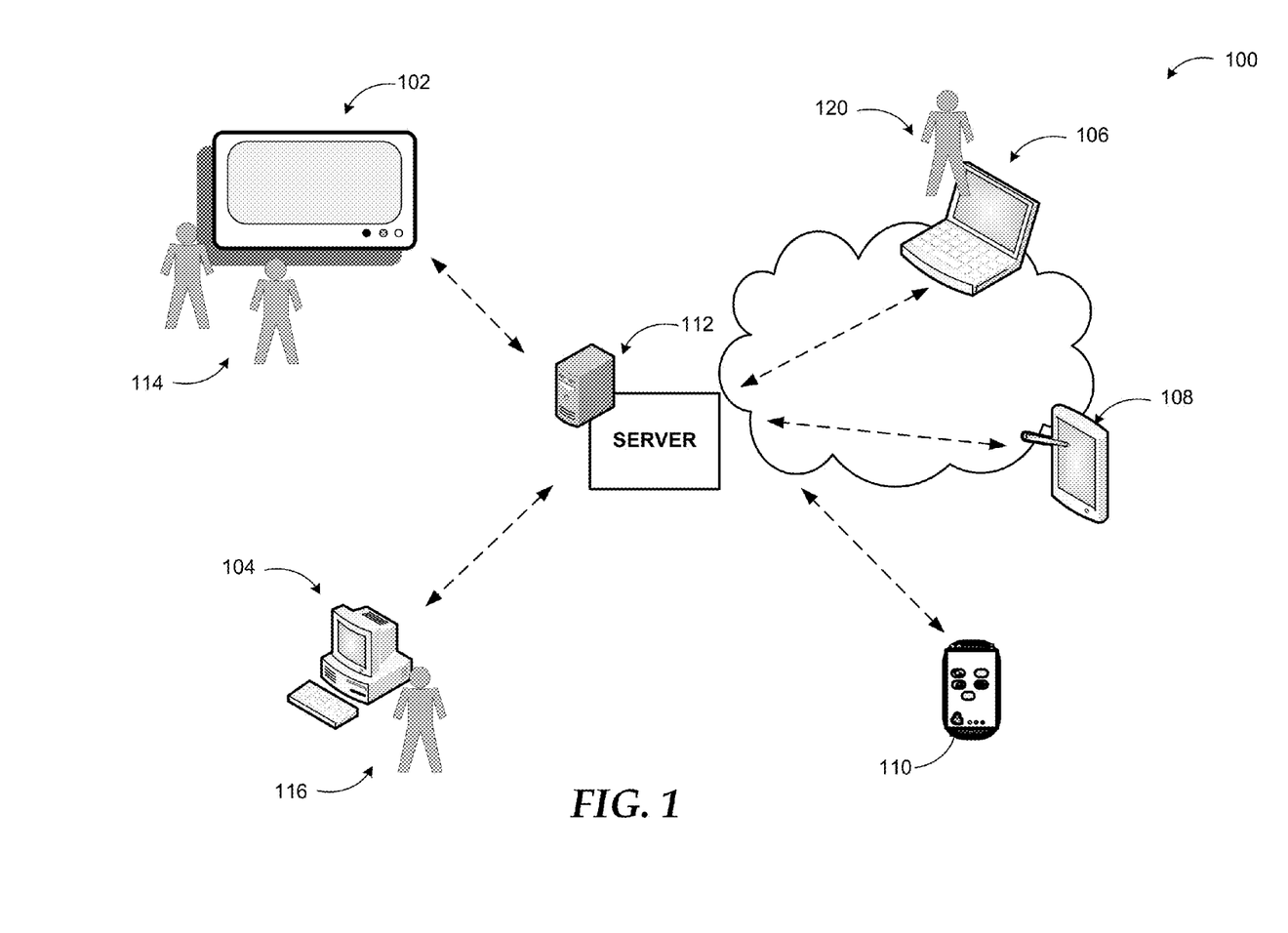
FIG. 1 illustrates an example collaborative environment where whiteboard sharing may be employed.

FIG. 1 illustrates an example collaborative environment where whiteboard sharing may be employed. In a collaborative environment two or more users may interact with a whiteboard concurrently. As illustrated in diagram 100, a whiteboard may be an interactive whiteboard 102, and may enable interaction between multiple users 114, 116, 120 and multiple client devices. Some example client devices may include as a desktop computing device 104, a personal computer 106, a tablet 108, a smartphone 110, and other similar client devices. An interactive whiteboard 102 may also be connected to a projector which may display the desktop of the client device on the user interface surface of the interactive whiteboard 102. The interactive whiteboard 102 may be connected with the one or more client devices over a network, which may be a wired or wireless network. Additionally, the interactive whiteboard may also be connected with the one or more client devices over a cloud network 112. Interactive whiteboards may be configured to recognize handwriting and translate handwriting into text, enable quick annotations on content displayed on the whiteboard, receive input from multiple computing devices, and receive input from multiple users.

Figure 2:
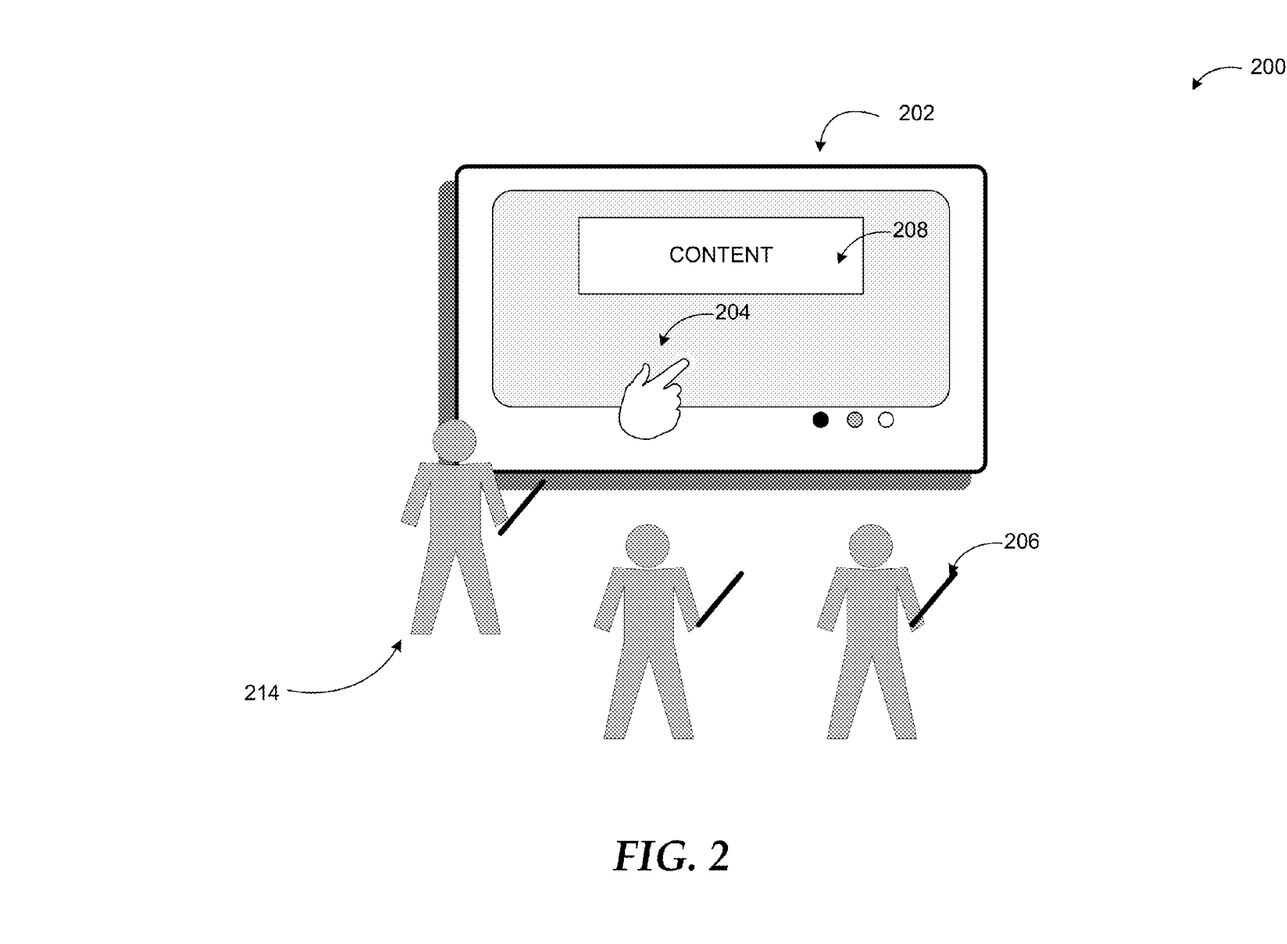
FIG. 2 illustrates an example multi-user environment enabling multiple users to interact with a whiteboard concurrently.

FIG. 2 illustrates an example multi-user environment enabling multiple users to interact with a whiteboard concurrently. As demonstrated in diagram 200, an interactive whiteboard 202 may enable two or more users 214 to interact with the interactive whiteboard 202 concurrently. In some examples, the interactive whiteboard 102 may enable the one or more users 114, 116 to interact with the whiteboard 102 directly using an input device. Some example conventional input devices may be an interactive stylus 206, electronic pen, keyboard, and/or mouse. Additionally, the interactive whiteboard 102 may be a touch or gesture-enabled device, such that hand gestures and finger touch 204 may be recognized as input methods for interacting with, controlling, and providing content 208 to the interactive whiteboard 202.

In an example scenario, as illustrated in diagram 200, the interactive whiteboard 202 may be configured to receive input from the two or more users 214 concurrently. Each user may utilize a different input method for providing content 208 to the interactive whiteboard 202. For example, one user may utilize a stylus 206 to make provide content 208, make annotations, and otherwise interact with the interactive whiteboard 202, and a second user may utilize finger touch 204 to also interact with the interactive whiteboard 202. The interactive whiteboard 202 may identify and track each input by hand or by input device individually and concurrently. The interactive whiteboard 202 may recognize each different input device, and may identify to which user the input device belongs. The interactive whiteboard 202 may be configured to distinguish each input type and/or input device. When displaying content 208 from each user's input on the interactive whiteboard 202, the interactive whiteboard 202 may indicate which input type (user) and/or device provided the displayed content 208. An example indication may be color and/or graphical indications, annotations, and/or pop-up windows and comments specifying which user provided the displayed content 208. Additionally the interactive whiteboard 202 may adjust placement, formatting, and style of the content to distinguish content from each user.

Figure 3:
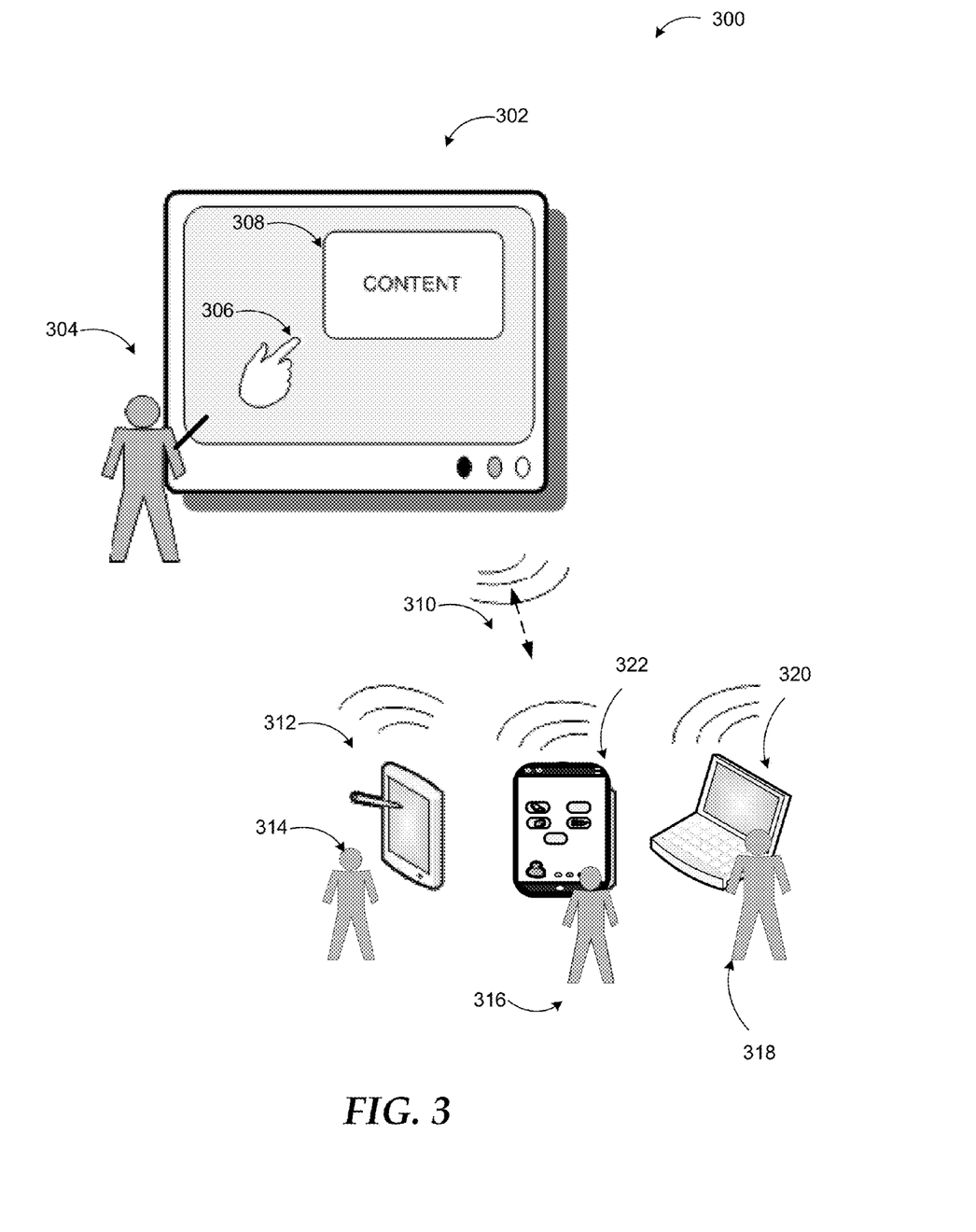
FIG. 3 illustrates an example multi-user environment enabling multiple users to interact with a whiteboard from individual client devices.

FIG. 3 illustrates an example multi-user environment enabling multiple users to interact with a whiteboard from individual client devices. As illustrated in diagram 300, multiple users 304, 314, 316, 318 may interact with an interactive whiteboard 302 concurrently employing individual client devices 312, 322, 320. For example, a first user 304 may directly interact with and provide content 308 to the interactive whiteboard 302 employing an input device such as a stylus or a touch input 306. A second user 314 may concurrently interact with the interactive whiteboard 302 employing a tablet 312, a third user 316 may interact with the interactive whiteboard 302 employing a smartphone 322, and a fourth user 318 may interact with the interactive whiteboard 302 employing a personal computer 320. The previously named client devices are exemplary and are not intended to be limiting. Any client device enabling interaction with the interactive whiteboard 302 may be employed by one or more users.

In an example embodiment, the individual client devices may be configured to enable communication 310 with the interactive whiteboard 302 via a wired or wireless connection. The interactive whiteboard 302 may be configured to recognize each individual client device, and to distinguish input from each individual device, such that when displaying content 308 from each individual device on the interactive whiteboard 302, the interactive whiteboard 302 may indicate which client device provided the input for the displayed content 308.

In a system according to embodiments, the interactive whiteboard 302 may initiate interaction with the one or more individual client devices 312, 322, 320 by inviting the individual device to a collaboration session. Upon acceptance by the invited client device, communication 310 between the interactive whiteboard 302 and the client device may be initiated. The interactive whiteboard 302 may be configured to automatically invite one or more individual client devices to a collaboration session upon detection of the presence of the individual client device. Additionally, a user controlling the interactive whiteboard 302 may actively initiate a collaboration session by selecting one or more individual client devices with which to interact. In another example, each individual device may initiate interaction with the interactive whiteboard 302 by requesting to initiate a collaboration session. The interactive whiteboard 302 may accept the invitation in order to establish interaction and communication between the interactive whiteboard 302 and the requesting client device.

Figure 4:
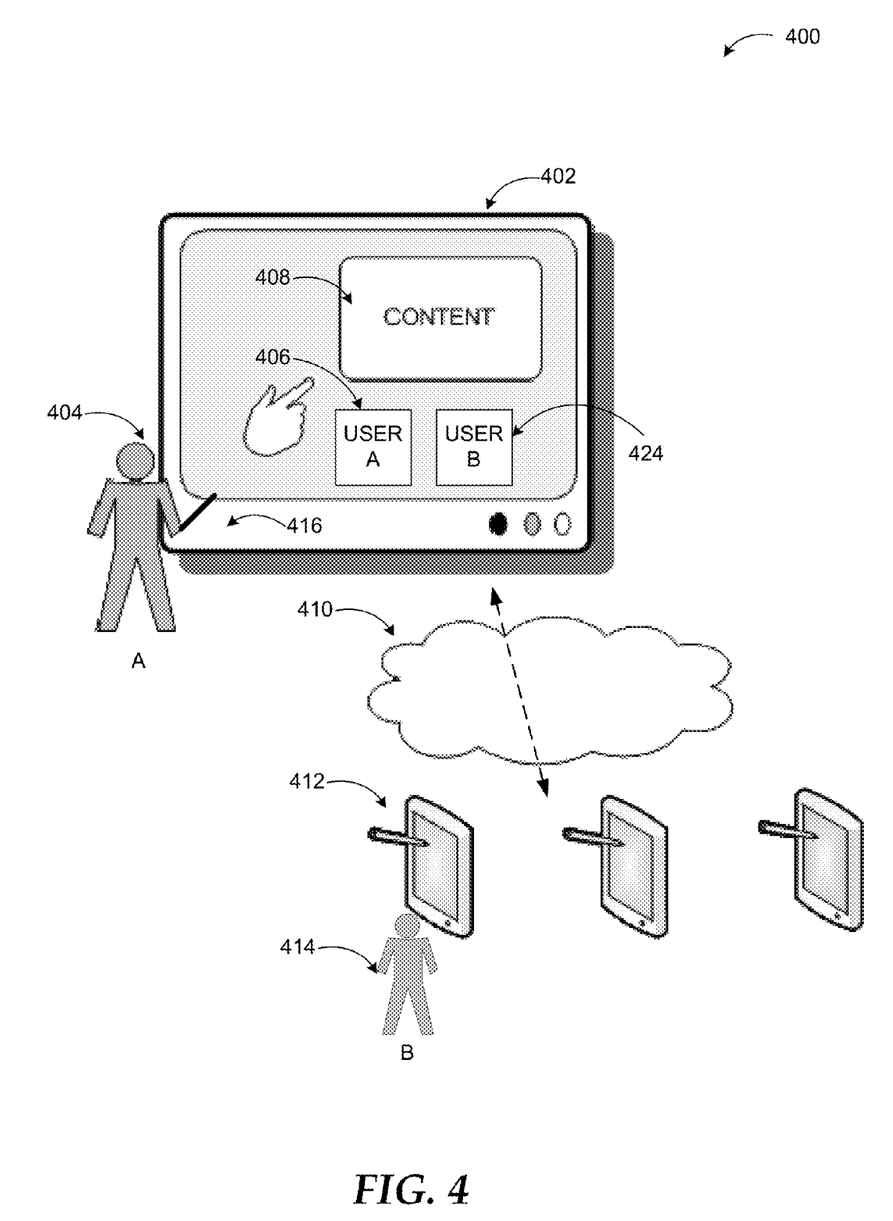
FIG. 4 illustrates an example multi-user environment enabling multiple users to interact with a whiteboard over a network.

FIG. 4 illustrates an example multi-user environment enabling multiple users to interact with a whiteboard over a network. As previously discussed, one or more users 414 may interact with an interactive whiteboard 402 from one or more individual devices 412, such as a personal computer, a desktop computer a smart phone, a tablet, and other similar client devices. As illustrated in diagram 400, the individual client devices 412 may be configured to communicate with the interactive whiteboard 402 over a network such as a cloud network 410 for example. Each user and associated client device may be located in different locations, such as home, work, school, library, or other location enabling connection over a network. The individual client devices 412 may be configured to connect with the interactive whiteboard 402 over the network, such as the cloud network 410, for enabling interaction and communication between the interactive whiteboard 402 and the client devices 412.

When the individual devices 412 and the interactive whiteboard 402 are connected, the interactive whiteboard 402 may be configured to receive input from each of the client devices 412 and to display the input as content 408 on the user interface of the interactive whiteboard 402. Additionally, when connected, the interactive whiteboard 402 may enable desktop sharing such that the interface and content of one or more of the individual devices 412 may be displayed on the interface of the interactive whiteboard 402.

In an example embodiment, when the interactive whiteboard receives input from two or more individual client devices 412, the interactive whiteboard 402 may recognize, track, and distinguish content that is input from each individual device over the network such that the content 408 displayed on the interactive whiteboard 402 may reflect which device provided the content 408. For example, a first user 404 may input content directly at the interactive whiteboard 402 employing a stylus and/or touch input. The interactive whiteboard 402 may display the content 406 from the first user 404, and may indicate that the content was provided by the first user. An indication may be a text label and/or a graphical representation such as color coding for indicating that the content 406 was input by the first user 404. Likewise, a second user 414 may provide input to the interactive whiteboard 402 employing the second user's 414 individual client device 412. When the interactive whiteboard 402 receives the content input from the second user 414, the interactive whiteboard 402 may display that content 424 from the second user 414 on a content pane of the interface of the interactive whiteboard 402, and may indicate that the content was provided by the second user 414 by providing a textual and/or graphical indication. The interactive whiteboard 402 may also share the interface of the interactive whiteboard 402 with the connected individual client devices 412 such that each individual device may continuously reflect the interactive whiteboard with all input from each connected client device controlling and providing input to the interactive whiteboard 402.

In an additional embodiment, the interactive whiteboard 402 may receive input from multiple users via input by a user directly at the physical interface of the interactive whiteboard and also at the user's individual client device. When the interactive whiteboard 402 receives content input from one or more sources, such as the interface of the interactive whiteboard 402 and at one or more connected client devices, the content may be placed on the interface as a separate text or content window which may resemble a sticky note, for example. A sticky note may be a window or pop-up box displaying content such as text and graphics, and it may be displayed on the user interface of the interactive whiteboard 402 for displaying content input by one or more users. The interactive whiteboard 402 may create a sticky note collection in addition to any content created directly on the interactive whiteboard 402. Each sticky note may be distinguishable based on the user or client device that provided the sticky note content in order to help distinguish and organize content shared with the interactive whiteboard 402 by multiple users. The placement and size of the content windows, or sticky notes, may be easily manipulated, such that they do not interfere with the content of the interactive whiteboard and can be easily moved, hidden, displayed and otherwise changed by one or more users interacting with the interactive whiteboard 402.

Figure 5:
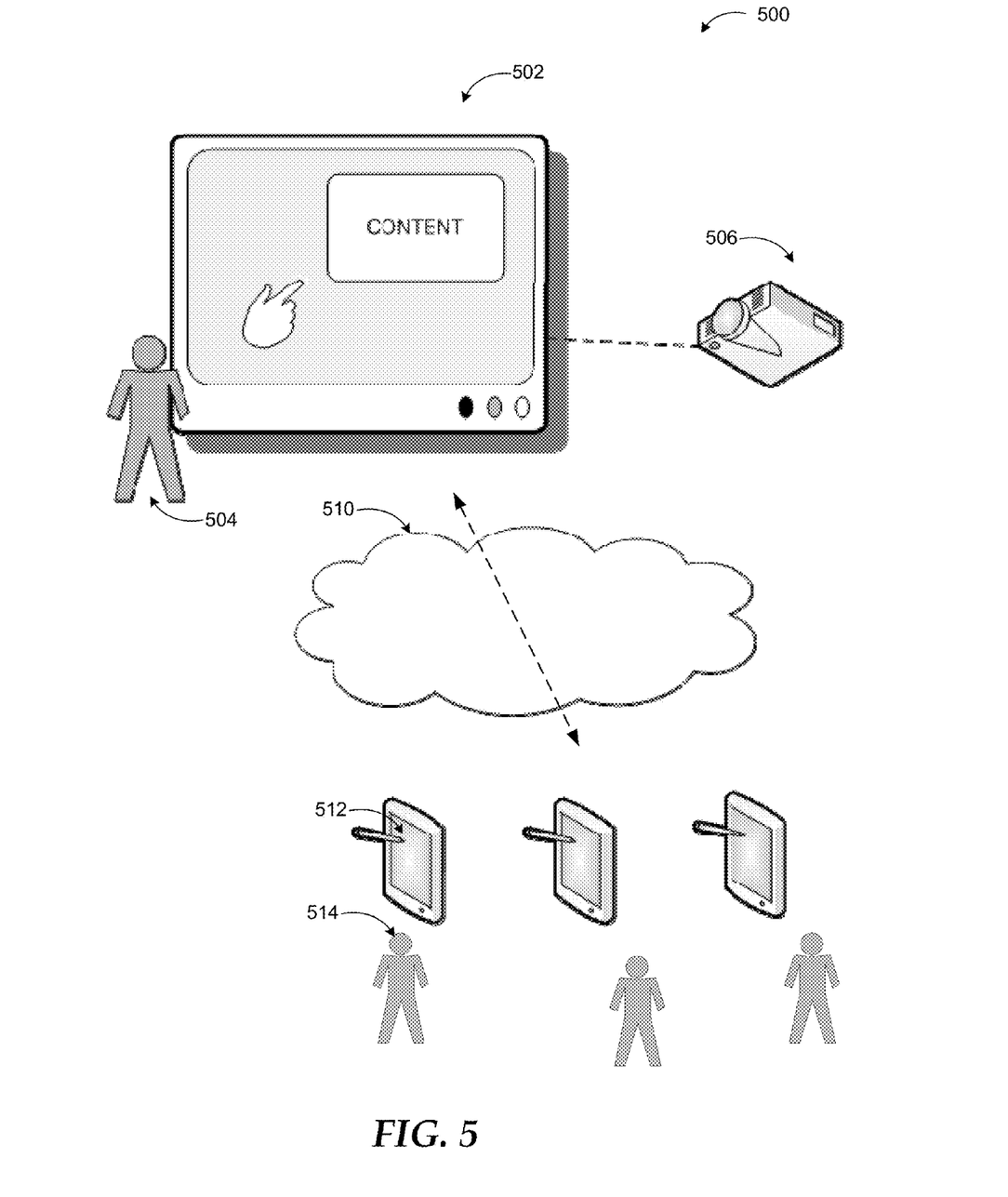
FIG. 5 illustrates an example whiteboard sharing environment enabling telepresence collaboration.

FIG. 5 illustrates an example whiteboard sharing environment enabling telepresence collaboration. As illustrated in diagram 500, an interactive whiteboard 502 may be configured to communicate with one or more individual client devices 512. The individual client devices 512 may be configured to communicate 510 with the interactive whiteboard 502 over a wired or wireless network, which may be a wired or wireless network, such as a cloud network, for example. The interactive whiteboard 502 may also be configured to enable telepresence collaboration between two or more users 504, 514 over the network 510. Telepresence collaboration may involve employing multiple cameras, displays, and projectors for enabling the users to feel present in a single location and to interact with the interactive whiteboard 502 as if all of the users 514 are present in the single location. Telepresence collaboration may synchronize real-time telepresence conferencing and content collaboration through the interactive whiteboard 502 for enabling users 514 in remote locations to contribute to the interactive whiteboard 502.

In an example embodiment, during telepresence collaboration, users 514 may be located in different remote locations, and each of the users 514 may be able to interact with and control the interactive whiteboard 502 from their remote location while participating in a real-time telepresence conference. The interactive whiteboard 502 may be used in conjunction with one or more projectors for enabling real-time collaboration with access to other data, applications, and features, including audio/video communication. For example, one or more users 514 may initiate a telepresence video conference such that users may be connected with each other using audio/video communication. The interactive whiteboard 502 may be shared over the telepresence video conference, and the users 514 at each location may view content on the interactive whiteboard 502 as well as contribute content to the interactive whiteboard 502. The users 514 may use individual client devices 512 to interact with the interactive whiteboard 502. The individual client devices 512 may be configured to connect with the interactive whiteboard 502 over the network 510 to enable interaction and communication between the interactive whiteboard 502 and the client devices 512.

In an example embodiment, the interface of the interactive whiteboard 502 may be displayed on each individual client device, and each user may interact with the interactive whiteboard 502 on the user's individual client device. The input that each user provides on the individual client device may be synchronized with the interactive whiteboard 502 and displayed on the interface of the interactive whiteboard 502. For example, the interactive whiteboard 502 may be configured to recognize input from each of the users in their remote locations. Input may be gesture input and physical input employing a client device such as a computer, tablet or smart phone. Telepresence conferencing in conjunction with the interactive whiteboard 502 may enable real-time conversations through video through cameras and projectors 506 while enabling documents, notes, files, and applications to be shared through the interactive whiteboard 502.

Figure 6:
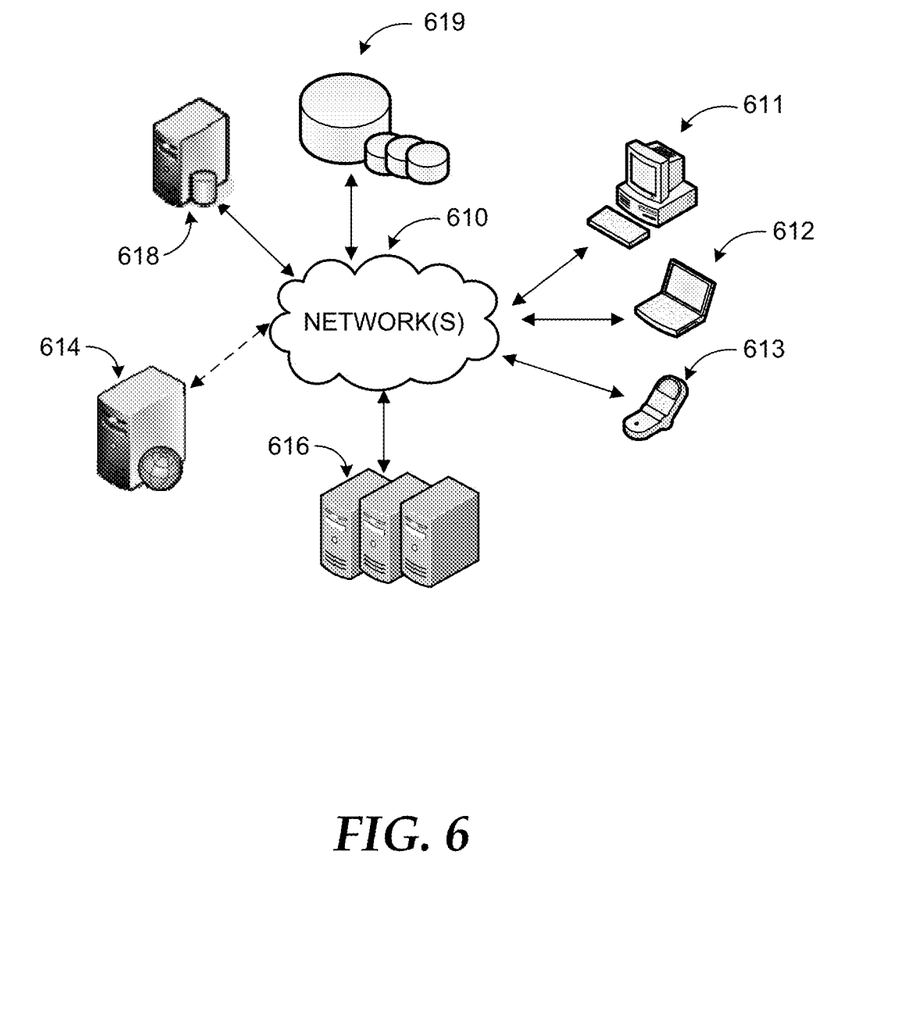
FIG. 6 is a networked environment, where a system according to embodiments may be implemented.

FIG. 6 is an example networked environment, where embodiments may be implemented. In addition to locally installed applications, such as application 822 discussed below, interactive whiteboard sharing may also be employed in conjunction with hosted applications and services that may be implemented via software executed over one or more servers 606 or individual server 608. A hosted service or application may be a web-based service or application, a cloud based service or application, and similar ones, and communicate with client applications on individual computing devices such as a handheld computer 601, a desktop computer 602, a laptop computer 603, a smart phone 604, a tablet computer (or slate), 605 (client devices') through network(s) 610 and control a user interface presented to users. One example of a web-based service may be a productivity suite that provides word processing, spreadsheet, communication, scheduling, presentation, and similar applications to clients through a browser interface on client devices. Such a service may enable users to interact with a whiteboard through a variety of input mechanisms as discussed herein.

Client devices 601-605 are used to access the functionality provided by the hosted service or application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, data sources, and data distribution systems may be employed to provide interactive whiteboard sharing. Furthermore, the networked environments discussed in FIG. 6 are for illustration purposes only. Embodiments are not limited to the example applications, modules, or processes.

Figure 7:
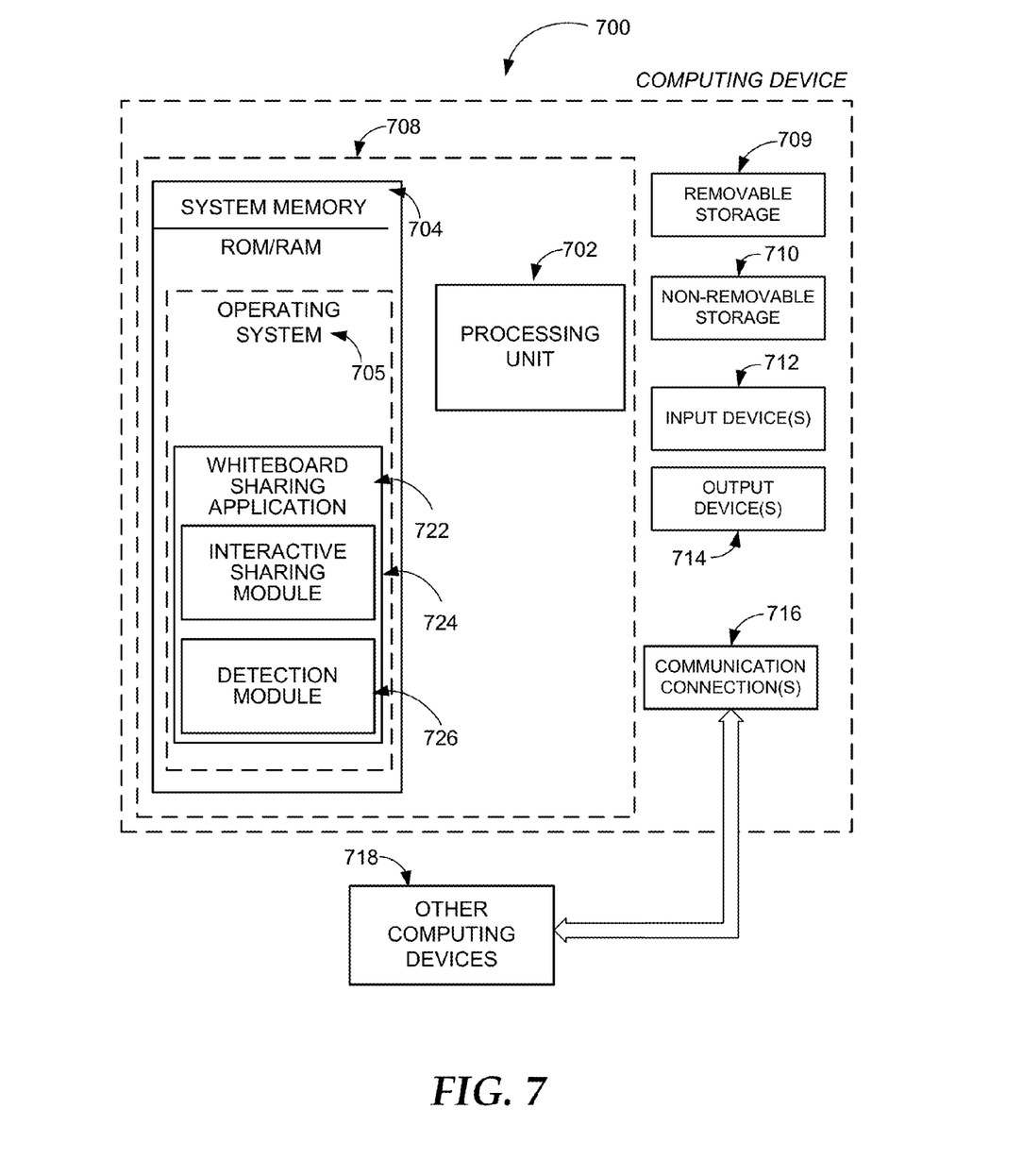
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be any touch and/or gesture enabled device in stationary, mobile, or other form such as the example devices discussed in conjunction with FIGS. 1A, 1B, and 10, and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS®, WINDOWS MOBILE®, or WINDOWS PHONE® operating systems from MICROSOFT CORPORATION of Redmond, Wash. The system memory 704 may also include one or more software applications such as program modules 706, whiteboard application 722, interactive sharing module 724 and detection module 726.

Interactive sharing module 724 may operate in conjunction with the operating system 705 or application 722 to enable interaction and collaboration with a whiteboard as discussed previously. Detection module 726 may detect various inputs to the whiteboard including physical input, gesture input, wired and wireless input over a network. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, an optical capture device for detecting gestures, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wireless network in a distributed computing environment, a satellite link, a cellular link, and comparable mechanisms. Other devices 718 may include computer device(s) that execute communication applications, other directory or policy servers, and comparable devices. Communication connection(s) 716 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
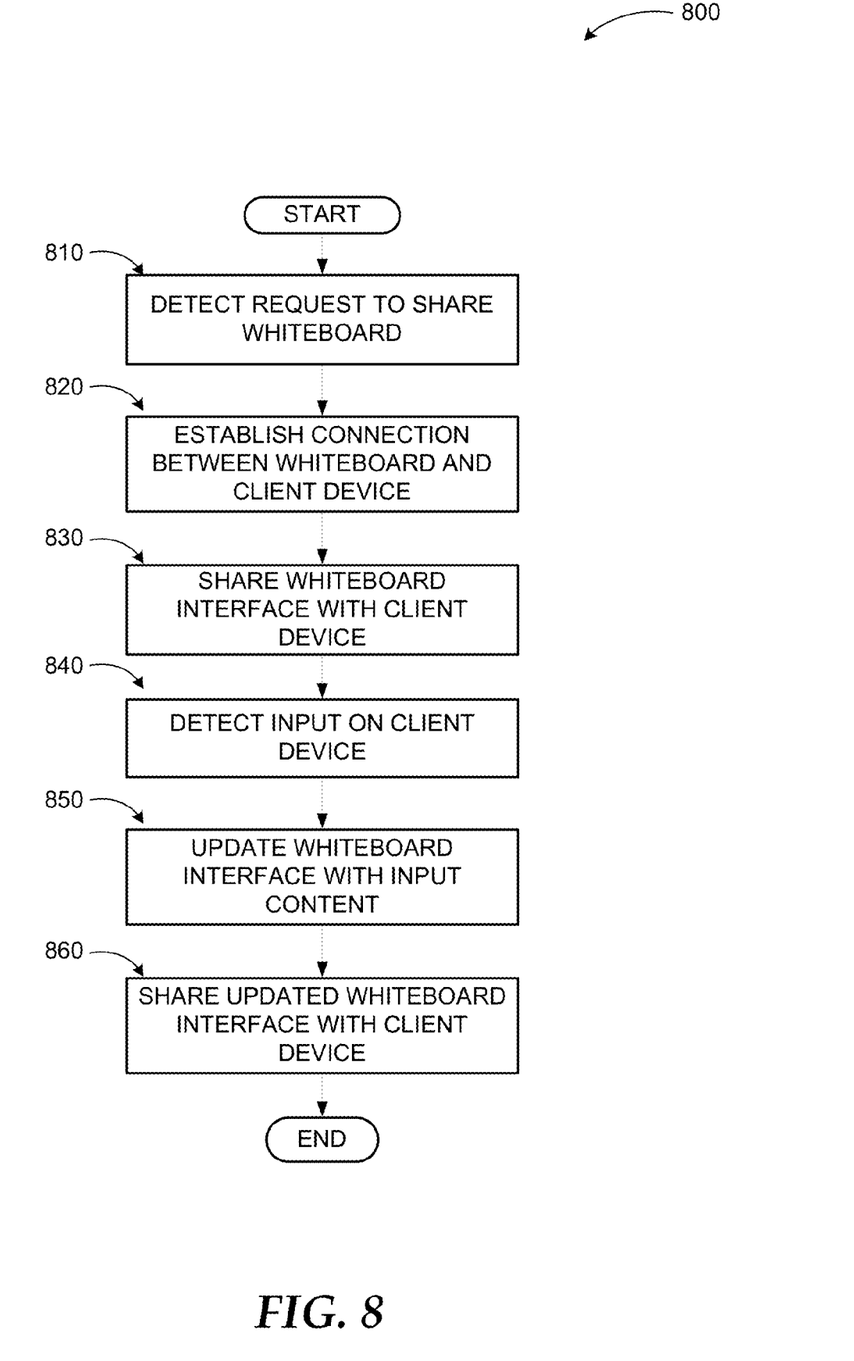
FIG. 8 illustrates a logic flow diagram for a process of enabling interactive whiteboard sharing and collaboration according to embodiments.

FIG. 8 illustrates a logic flow diagram for a process of enabling interactive whiteboard sharing and collaboration according to embodiments. Process 800 may be implemented as part of an application or an operating system.

Process 800 begins with operation 810, where an interactive whiteboard may detect a request to share the whiteboard with one or more client devices. Upon detection of a request to share the interactive whiteboard, at operation 820 the interactive whiteboard may establish a connection with the one or more client devices to enable collaboration and interaction with the interactive whiteboard. The interactive whiteboard may connect with the client devices over a wired or wireless network such as a cloud network. The interactive whiteboard and the client devices may be located in a close proximity to each other, such as in a same room or building. The interactive whiteboard and the client devices may also be located in remote locations from each other such as different buildings, cities, states and countries, and may be connected with each other over a network for enabling the interactive whiteboard and the client devices to interact.

Following the establishment of a connection between the interactive whiteboard and the one or more client devices, at operation 830 the interactive whiteboard interface may be shared with the client devices. The content displayed on the interactive whiteboard may be shared with the client devices such that users associated with the client devices may view the content as it is displayed on the physical whiteboard.

At operation 840, the one or more users associated with the client devices may interact with the interface of the whiteboard as it is displayed on the user's client device. The user may control the interface of the interactive whiteboard to navigate and make selections, and additionally the user may add content to the interactive whiteboard by providing input at the client device. The interactive whiteboard may detect the input at the client device, and if multiple client devices are concurrently viewing and sharing the interactive whiteboard, the interactive whiteboard may distinguish the input to each individual client device.

At operation 850, the interactive whiteboard may update the interface of the interactive whiteboard with content provided by users at each individual client device. Additionally the interactive whiteboard may continuously be updated with selections, navigation, and other control manipulations made by a user at the individual client device, such that the interactive whiteboard continuously reflects changes made by two or more users on the interactive whiteboard itself and on individual client devices connected with the interactive whiteboard. At operation 860, the updated interface of the interactive whiteboard may be shared over the connection with the connected client devices such that the client devices continuous reflect all input and changes made to the interactive whiteboard by users on the interactive whiteboard itself and on other individual client devices connected with the interactive whiteboard.

The operations included in process 800 are for illustration purposes. Enabling interactive whiteboard sharing according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for enabling interactive whiteboard sharing, the method comprising:

detecting a request to share content displayed on an interface of a whiteboard with one or more client devices, wherein the request is initiated by the whiteboard as an invitation to collaborate;

establishing a connection between the whiteboard and the one or more client devices;

sharing the content of the whiteboard with the one or more client devices;

detecting input to the whiteboard provided on the one or more client devices;

updating the interface of the whiteboard with the input detected on the one or more client devices;

detecting another input by two or more users directly on the interface of the whiteboard;

distinguishing the other input to the whiteboard to indicate a source of the other input; and providing desktop sharing on the interface of the whiteboard, wherein one or more of: the shared content of the one or more client devices and the interface of the one or more client devices are displayed on the interface of the whiteboard by the desktop sharing.

2. The method of claim 1, detecting one or more both of the input and the other input to the whiteboard further comprises:

detecting one or more of: a selection, a navigation action, a resizing action, a formatting action, newly generated content, and edits to existing content shared by the whiteboard.

3. The method of claim 1, further comprising:

sharing the updated interface of the whiteboard with the one or more client devices.

4. The method of claim 1, wherein the other input is provided directly on the interface of the whiteboard by the two or more users employing one or more of: an electronic pen, a stylus, a mouse, a keyboard, a gesture, and a touch input.

5. The method of claim 1, wherein distinguishing one or both of the input and the other input to the whiteboard to indicate the source of the one or both of the input and the other input further comprises:

indicating the source of the one or both of the input and the other input employing one or more of: a textual and a graphical indication.

6. The method of claim 1, wherein distinguishing one or both of the input and the other input to the whiteboard to indicate the source of the one or both of the input and the other input further comprises:

adjusting placement and formatting of the shared content on the interface of the whiteboard depending on the source of the one or both of the input and the other input.

7. The method of claim 1, wherein distinguishing one or both of the input and the other input to the whiteboard to indicate the source of the one or both of the input and the other input further comprises:

displaying the one or both of the input and the other input to the whiteboard as a content pane on the user interface of the whiteboard.

8. The method of claim 7, wherein the content pane is configured to indicate the source of the shared content.

9. The method of claim 1, further comprising:

connecting the whiteboard with one or more video projectors for enabling telepresence collaboration in conjunction with the shared content of the whiteboard with the one or more client devices.

10. A computing device for enabling interactive whiteboard sharing, the computing device comprising:

a memory storing instructions;
a processor coupled to the memory, the processor executing an interactive whiteboard sharing application, wherein the interactive whiteboard sharing application is configured to:
  detect a request to share content displayed on an interface of a whiteboard with one or more client devices, wherein the request is initiated by the whiteboard as an invitation to collaborate;
  establish a connection between the whiteboard and the one or more client devices;
  share the content of the whiteboard with the one or more client devices;
  detect input to the whiteboard provided on the one or more client devices;
  update the interface of the whiteboard with the input detected on the one or more client devices;
  share the interface of the whiteboard with the one or more client devices;
  receive content designated as sticky note content through one of the interface of the whiteboard and the one or more client devices;
  display the content as a sticky note on the interface of the whiteboard, wherein the sticky note is distinguished from the shared content based on the one or more client devices that provided the sticky note; and
  provide desktop sharing on the interface of the whiteboard, wherein one or more of: the shared content of the one or more client devices and the interface of the one or more client devices are displayed on the interface of the whiteboard by the desktop sharing.

11. The computing device of claim 10, wherein the detected input is one or more of: a selection, a navigation action, a resizing action, a formatting action, newly generated content, and edits to existing content shared by the whiteboard.

12. The computing device of claim 11, wherein the established connection between the whiteboard and the one or more client devices is one or more of: a wired, a wireless, and a network connection.

13. The computing device of claim 11, wherein the interactive whiteboard sharing application is further configured to:
  distinguish the input to the whiteboard to indicate a source of the input employing one or more of: a graphical indication and a textual indication.

14. The computing device of claim 11, wherein the request to share content displayed on the interface of the whiteboard is initiated by one or more of the client devices as a request to collaborate with the whiteboard.

15. A computer-readable memory device with instructions stored thereon for enabling interactive whiteboard sharing, the instructions containing:
  detecting a request to share content displayed on an interface of a whiteboard with one or more client devices, wherein the request is initiated by the whiteboard as an invitation to collaborate;
  establishing a connection between the whiteboard and the one or more client devices;
  sharing the content of the whiteboard with the one or more client devices;
  detecting input to the whiteboard provided on the one or more client devices, wherein the input is one or more of: a selection, a navigation action, a resizing action, a formatting action, newly generated content, and an edit to existing content shared by the whiteboard;
  updating the interface of the whiteboard with the input detected on the one or more client devices;
  sharing the interface of the whiteboard with the one or more client devices;
  detecting another input by two or more users directly on the interface of the whiteboard;
  distinguishing the other input to the whiteboard to indicate a source of the other input; and
  providing desktop sharing on the interface of the whiteboard, wherein one or more of: the shared content of the one or more client devices and the interface of the one or more client devices are displayed on the interface of the whiteboard by the desktop sharing.

16. The computer-readable memory device of claim 15, wherein the instructions further comprise:
  connecting the whiteboard with one or more video projectors for enabling telepresence collaboration, wherein telepresence collaboration enables audio/visual interaction in conjunction with the shared content of the whiteboard with the one or more client devices.

* * * * *